(12) United States Patent
Mestre et al.

(10) Patent No.: US 11,392,957 B2
(45) Date of Patent: Jul. 19, 2022

(54) USER VERIFICATION FOR CREDENTIAL DEVICE

(71) Applicant: MASTERCARD INTERNATIONAL INCORPORATED, Purchase, NY (US)

(72) Inventors: Patrick Mestre, Sart-Bernard (BE); Patrik Smets, Nijlen (BE); Eddy Van De Velde, Leuven (BE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 16/811,843

(22) Filed: Mar. 6, 2020

(65) Prior Publication Data
US 2020/0286098 A1 Sep. 10, 2020

(30) Foreign Application Priority Data

Mar. 7, 2019 (GB) ..................................... 1903099
Dec. 16, 2019 (GB) ..................................... 1918485

(51) Int. Cl.
*G06Q 20/40* (2012.01)
*G06Q 20/34* (2012.01)
(Continued)

(52) U.S. Cl.
CPC ..... *G06Q 20/40975* (2013.01); *G06Q 20/341* (2013.01); *G06Q 20/352* (2013.01);
(Continued)

(58) Field of Classification Search
CPC ......... G06Q 20/40975; G06Q 20/3823; G06Q 20/3827; G06Q 20/3829; G06Q 20/352;
(Continued)

(56) References Cited

U.S. PATENT DOCUMENTS 9,990,632 B1 6/2018 Koeppel et al.
2004/0124246 A1* 7/2004 Allen .................... G07F 7/1008
235/492
(Continued)

FOREIGN PATENT DOCUMENTS

WO 2018000275 A1 1/2018

OTHER PUBLICATIONS

"International Search Report and Written Opinion Issued in PCT Application No. PCT/US2020/021311", dated Jun. 29, 2020, 12 Pages.

(Continued)

*Primary Examiner* — Sonji N Johnson
(74) *Attorney, Agent, or Firm* — Talem IP Law, LLP

(57) ABSTRACT

A method for verification of a bearer of a credential device at a device reader is described. The method comprises first establishing a digital communication channel with the credential device, and then determining a set of verification options for the bearer and providing the set of verification options to the credential device over the digital communication channel. The credential device then selects a verification option from the set of verification options and communicates this to the device reader. The device reader can then verify the bearer of the credential device in accordance with the selected verification option. Methods at both the credential device and the device reader are described, as are suitably programmed credential devices and device readers.

20 Claims, 7 Drawing Sheets

(51) Int. Cl.
    *G06Q 20/38*         (2012.01)
    *H04L 9/06*          (2006.01)
    *H04L 9/08*          (2006.01)

(52) U.S. Cl.
    CPC ..... *G06Q 20/3823* (2013.01); *G06Q 20/3827* (2013.01); *G06Q 20/3829* (2013.01); *H04L 9/0643* (2013.01); *H04L 9/0825* (2013.01); *H04L 9/0844* (2013.01)

(58) Field of Classification Search
    CPC ............ G06Q 20/341; G06Q 20/3278; G06Q 20/401; G06Q 20/382; H04L 9/0643; H04L 9/0825; H04L 9/0844; H04L 9/3066; H04L 2209/56; H04L 9/0841; H04L 9/0631; G07F 7/0893
    See application file for complete search history.

(56) References Cited

U.S. PATENT DOCUMENTS

| | | |
|---|---|---|
| 2010/0275011 A1 | 10/2010 | Horgan et al. |
| 2012/0144193 A1 | 6/2012 | Le Saint et al. |
| 2015/0106616 A1 | 4/2015 | Nix |
| 2015/0121086 A1 | 4/2015 | Smith et al. |
| 2015/0134469 A1 | 5/2015 | White et al. |
| 2015/0143125 A1 | 5/2015 | Nix |
| 2016/0292676 A1 | 10/2016 | French et al. |
| 2017/0091727 A1* | 3/2017 | Richards ............ G06Q 20/3825 |
| 2017/0255922 A1* | 9/2017 | Jin ....................... G06Q 20/405 |
| 2017/0308895 A1 | 10/2017 | Srivastava et al. |
| 2018/0181947 A1 | 6/2018 | Roberts et al. |
| 2018/0205538 A1 | 7/2018 | Le Saint |
| 2018/0268408 A1 | 9/2018 | Bortros et al. |
| 2019/0354980 A1 | 11/2019 | Li et al. |
| 2020/0160131 A1* | 5/2020 | Waga .................. H04L 63/0861 |
| 2020/0167775 A1 | 5/2020 | Reese et al. |
| 2022/0019995 A1* | 1/2022 | Ngo .................. G06Q 20/3829 |

OTHER PUBLICATIONS

"International Search Report and Written Opinion Issued in PCT Application No. PCT/US2020/021312", dated Jun. 30, 2020, 11 Pages.

Notice of Allowance issued in U.S. Appl. No. 16/811,727, dated Feb. 24, 2022, 27 pages.

* cited by examiner

USER VERIFICATION FOR CREDENTIAL DEVICE

TECHNICAL FIELD

This disclosure relates to user verification for a credential device. In embodiments, it is particularly relevant to user verification for a contactless card, and relates to developments in contactless readers and contactless cards and associated processes.

BACKGROUND

There are a number of environments in which an individual uses a device such as an integrated circuit card to interact with a system. Increasingly, such interaction takes place through a short-range wireless technology such as NFC, or through another contactless protocol. Such cards may be used to identify a legitimate bearer—for example, for access control—or may be used for additional functions such as payment.

Payment cards such as credit cards and debit cards are very widely used for all forms of financial transaction. The use of payment cards has evolved significantly with technological developments over recent years. Many payments are made at a retail location, typically with a physical transaction card interacting with a point of sale (POS) terminal to perform a transaction. These transaction cards may interact with a POS by swiping through a magnetic stripe reader, or for a "chip card" or "smart card" by direct contact with a smart card reader (under standard ISO/IEC 7816) or by contactless interaction through local short range wireless communication (under standard ISO/IEC 14443). These protocols may be used by active general purpose computing devices (such as a mobile phone), but there is still a strong need for passive devices such as a conventional transaction card (powered by the reader, directly in contact and inductively in contactless operation) or wearable devices.

In Europe, contactless cards generally operate under the EMV standard for interoperation of chip cards and associated apparatus provided and maintained by EMVCo. The current EMV Contactless Specifications for Payment Systems are available from https://www.emvco.com/specifications.aspx?id=21.

It is desirable to enhance existing specifications to improve effectiveness for all parties associated with a transaction system. Particular areas where enhancements are desirable are in security processes such as effective customer verification suitable to the circumstances of a transaction. It is desirable to achieve solutions which allow multiple benefits to be obtained and which allow existing solutions to be adapted without extensive modification. It would also be desirable to find solutions that provide benefits beyond the transaction domain which are more widely applicable for other types of cards and devices, particularly for other kinds of passive device.

BRIEF SUMMARY

In a first aspect, the disclosure provides a method for verification of a bearer of a credential device at a device reader, the method comprising: establishing a digital communication channel with the credential device; determining a set of verification options for the bearer and providing the set of verification options to the credential device over the digital communication channel; receiving a verification option selected from the set of verification options by the credential device; and verifying the bearer of the credential device in accordance with the selected verification option.

The credential device may be a payment device, for example a contactless payment device such as a payment card. This payment device may operate according to EMV protocols, and the verification options may be cardholder verification methods.

More generally, using this approach it is possible to provide a contactless transaction flow in which a cardholder verification mechanism for the transaction is determined by the card from choices offered by the reader—these may be determined by the reader as choices acceptable for the transaction (for example, on the basis of transaction value).

This may be provided when the reader requests the card to generate an application cryptogram. In embodiments, the reader device provides a list of cardholder verification methods with a command to provide an application cryptogram, and the payment device provides a chosen card verification method with the application cryptogram. The reader device may then be adapted to modify the transaction data from that sent to the payment device in the command to generate an application cryptogram dependent on the cardholder verification method choice. In particular, this may occur if the cardholder verification method requested is for an online PIN.

These cardholder verification options may comprise: no cardholder verification method, consumer device cardholder verification method, online PIN and cardholder signature.

In embodiments, the reader device provides a list of verification options, and wherein the credential device selects the first verification option in the list supported by the credential device.

In a second aspect, the disclosure provides a method at a credential device to support verification of a bearer of the credential device at a device reader, the method comprising: establishing a digital communication channel with the device reader; receiving from the device reader a set of verification options for the bearer over the digital communication channel; selecting a verification option from the set of verification options and communicating the selected verification option to the device reader for verifying the bearer of the credential device in accordance with the selected verification option.

The credential device may be a payment device, for example a contactless payment device such as a payment card. This payment device may operate according to EMV protocols, and the verification options may be cardholder verification methods.

These verification options may be cardholder verification methods. The reader device may provide a list of cardholder verification methods with a command to provide an application cryptogram, and the payment device provide a chosen card verification method with the application cryptogram.

The cardholder verification options may comprise: no cardholder verification method, consumer device cardholder verification method, online PIN and cardholder signature.

In embodiments, the reader device provides a list of verification options, and wherein the credential device selects the first verification option in the list supported by the credential device.

Suitably programmed system elements—such as a contactless reader and payment device—may also be provided.

In a third aspect, the disclosure provides a credential device adapted to support verification of a bearer of the credential device at a device reader, the credential device being adapted to: establish a digital communication channel with the device reader; receive from the device reader a set of verification options for the bearer over the digital communication channel; select a verification option from the set of verification options and communicate the selected verification option to the device reader for verifying the bearer of the credential device in accordance with the selected verification option.

This credential device is a passive device, powered by the reader. This may be a contactless payment device such as a payment card.

BRIEF DESCRIPTION OF THE DRAWINGS

Specific embodiments of the disclosure will be described below by way of example, with reference to the accompanying Figures, of which.

DETAILED DESCRIPTION

As will be discussed further below, in its broadest conception the disclosure is applicable to a variety of arrangements in which a user credential device is used in connection with a reader—particularly a contactless reader—with there being a potential need to establish that the bearer of the user credential device is the legitimate user. Embodiments discussed in detail below relate to payment devices such as payment cards, and in particular to contactless use cases.

Figure 1:
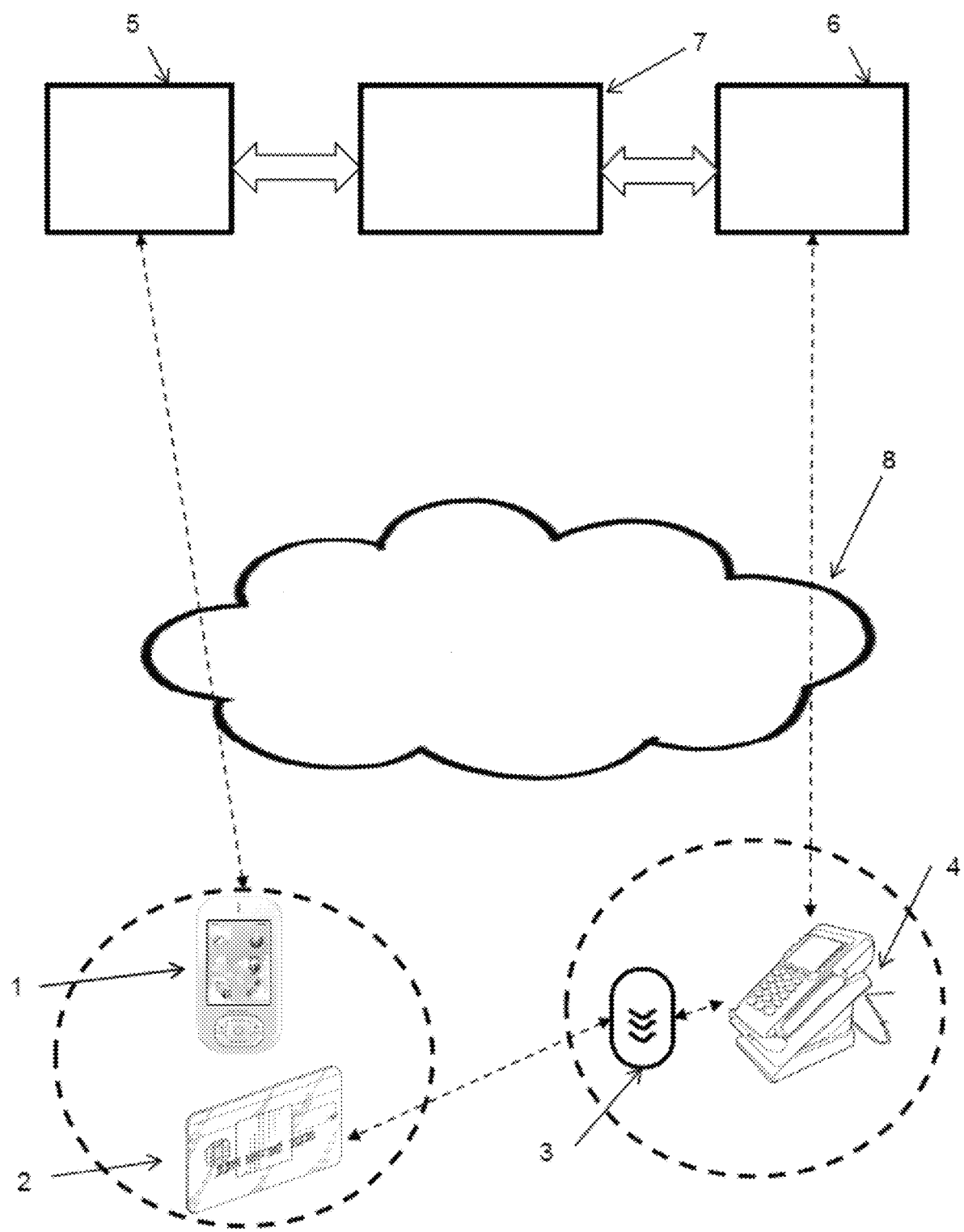
FIG. 1 shows schematically relevant parts of a representative transaction system suitable for implementing an embodiment of the disclosure.

FIG. 1 shows schematically relevant parts of a representative transaction system suitable for implementing embodiments of the disclosure.

A user (not shown) is provided with a payment device—this may be for example a payment card 2, but in particular embodiments it may be another form of payment device. Embodiments described here relate primarily to passive devices which typically lack their own power source and respond instead to activation in a powered interaction with a reader. A payment card is the most well-established form of such a device, but wearable devices such as rings or clothing are increasingly commonly used. A mechanism is here shown—mobile phone 1—to allow the user to interact with other elements of the system over a suitable network 8. The network 8 here represents any appropriate communication network for the communication path indicated, and may be the public internet, a cellular communications network or a private network, depending on the parties involved in the communication and the need for the communication path to be secure.

The payment device is adapted to use a contactless protocol for communication with a point of interaction (POI) terminal such as a point of sale (POS) terminal or an automated teller machine (ATM). The payment card 2 must therefore include a chip and a wireless transmitter and receiver adapted for short range communication by protocols such as those defined under ISO/IEC 14443—if used as a payment device. The payment card 2 also contains an EMV chip with a payment application installed, together with user credentials and all information and cryptographic material necessary to instantiate an EMV transaction. The terminal 4 must be provided with a reader 3 for contactless transactions, the terminal 4 and the reader 3 together providing in this case a POS system for a merchant. The operation of this system is described further below with reference to FIG. 2.

There is in the arrangement shown a mechanism in the form of mobile phone 1 to allow connection between the user computer devices and a card issuing bank 5 or system associated with the user. A banking infrastructure 7 will also connect the card issuing 5 and the merchant's transaction acquiring bank 6, allowing transactions to be carried out between them. This banking infrastructure will typically be provided by a transaction card provider who provides transaction card services to the card issuing bank 5. The banking infrastructure 7 provides authorization at the time of purchase, clearing of the transaction and reconciliation typically within the same working day, and settlement of payments shortly after that. The banking infrastructure 7 comprises a plurality of switches, servers and databases, and is not described further here as the details of the banking infrastructure used are not necessary for understanding how embodiments of the disclosure function and may be implemented.

Figure 2:
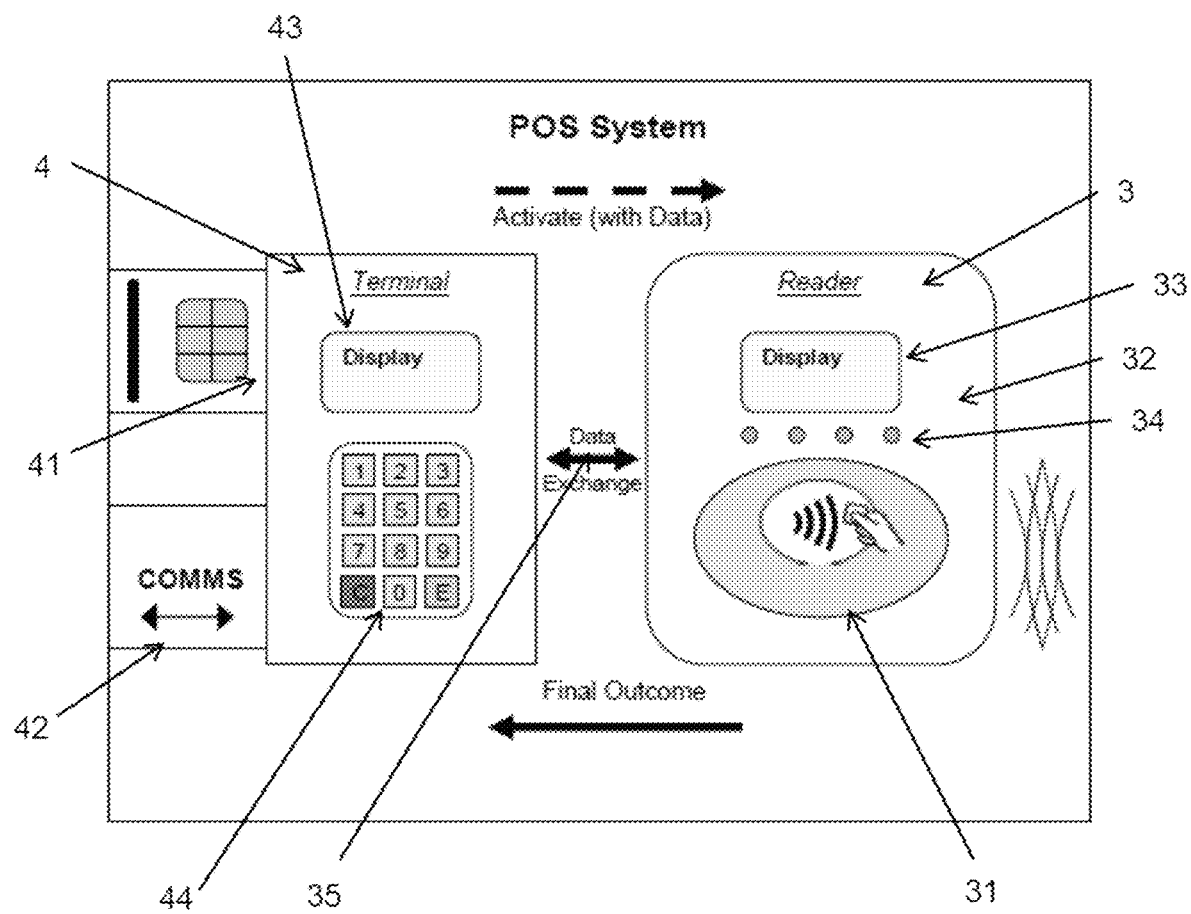
FIG. 2 illustrates the interaction between a contactless reader and a terminal.

The elements of a contactless transaction will now be described with reference to FIG. 2, which illustrates the interaction between the reader 3 and the terminal 4—the payment device is not explicitly shown. The reader 3 comprises a wireless communication interface 31 for wireless communication with the payment device, and a cardholder side user interface 32 including here a reader display 33 and signal lights 34. The reader also has a data communication path 35 to the terminal 4—this may be a wired connection or a wireless communication over a suitable local communication network (preferably secured to prevent effective eavesdropping). The terminal 4 is here a conventional POS terminal augmented by ability to communicate with the reader 3—it therefore comprises a reader interface 41 for interacting with other payment device types by contact (chip cards, magnetic stripes), a communication interface 42 for communicating directly or indirectly with a merchant's acquiring bank, and a user interface including a display 43 and a keypad 44 for use by merchant or customer as appropriate to the transaction.

A contactless transaction may be initiated by the merchant at the terminal 4 or by a payment device coming into range of the wireless communication interface 31 if a transaction is expected. The terminal 4 provides the reader 3 with sufficient details of the transaction and of the terminal to allow a transaction to take place between the two. The transaction follows protocols set out in the EMV Contactless Specifications for Payment Systems. The transaction amount is displayed to the customer on the reader display 33. The reader 3 provides sufficient information to the payment device to identify the transaction and the merchant and to provide confidence to the cardholder that the transaction is legitimate. The payment device provides sufficient information to identify the relevant cardholder account to the merchant, and to allow the merchant to the transaction with the merchant's acquiring bank (this may be considered to be a payment token provided by the payment device to indicate the user's commitment to the transaction)—online authorization may or may not be required during the transaction, depending on factors such as the size of the transaction. Included in this information provided by the payment device is verification information. The reader 3 determines a final outcome for the transaction, which is then communicated to the terminal 4.

Figure 3:
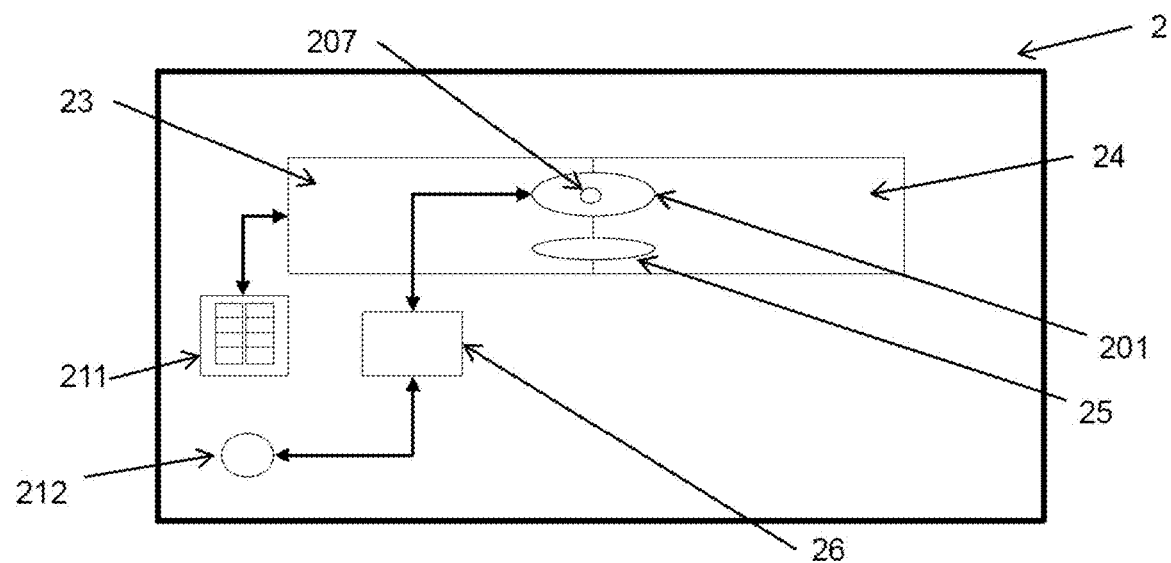
FIG. 3 shows in schematic form a payment card adapted for use as a payment device in embodiments of the disclosure.

FIG. 3 illustrates the functional features of a payment card 2 for use in embodiments of the disclosure in more detail. As indicated above, embodiments of the disclosure may be used with other payment devices, but the embodiment described in detail below relates to a payment card 2 with limited cryptographic capability.

FIG. 3 shows schematically relevant parts of a representative hardware and software architecture for a transaction card such as a payment card 2 (particularly an EMV payment card) suitable for implementing an embodiment of the disclosure. The payment card 2 comprises an application processor 23, one or more memories 24 associated with the application processor and a NFC controller 26. The payment card 2 is equipped with a contact pad 211 for contact transactions using contact card protocols such as ISO/IEC 7816 and also comprises an antenna 212 connected to NFC controller 26 to allow transactions under contactless card protocols such as those defined under ISO/IEC 14443.

In the arrangement shown, the application processor 23 and associated memories 24 comprise (shown within the processor space, but with code and data stored within the memories) a transaction application 201. The application processor 23 provides an NFC application 207 which interfaces with the NFC controller 26. A transaction may generally be performed over a contact card interface, a contactless card interface, or any other communication channel available to the card for communicating with a terminal (either general purpose or dedicated to the purpose)—however, in embodiments of the disclosure, contactless transactions are considered in particular.

The payment card 2 is capable of cryptographic processing, though its capabilities may be limited given the card form factor. In this embodiment, this is shown as a cryptographic processing function 25 provided within the application processor 23 and associated memories 24, but this can be implemented by a physically separated element (which is physically and/or logically protected from tampering or subversion) or may be incorporated within the main processing area but logically protected from subversion. In the embodiment described below, the cryptographic processing function 25 possesses at least one private and public key pair used to identify the card—the private key is unique to the card and its corresponding public key is certified by the card issuing bank 5. A corresponding card issuer public key may be certified by or on behalf of the provider of the transaction infrastructure 7, establishing a full chain of trust for the transaction infrastructure—this can be verified by the terminal 4 possessing the transaction infrastructure public key. The cryptographic processing function may hold several cryptographic key pairs and can perform cryptographic operations such as calculations to establish a session key, but its lack of processing power will affect its capabilities. For example, while the card may be able to generate new key pairs, signature generation and hashing are computationally demanding—generating a new key pair and signing the public key so it can be verified with a certified public key would be difficult as a result.

Figure 4:
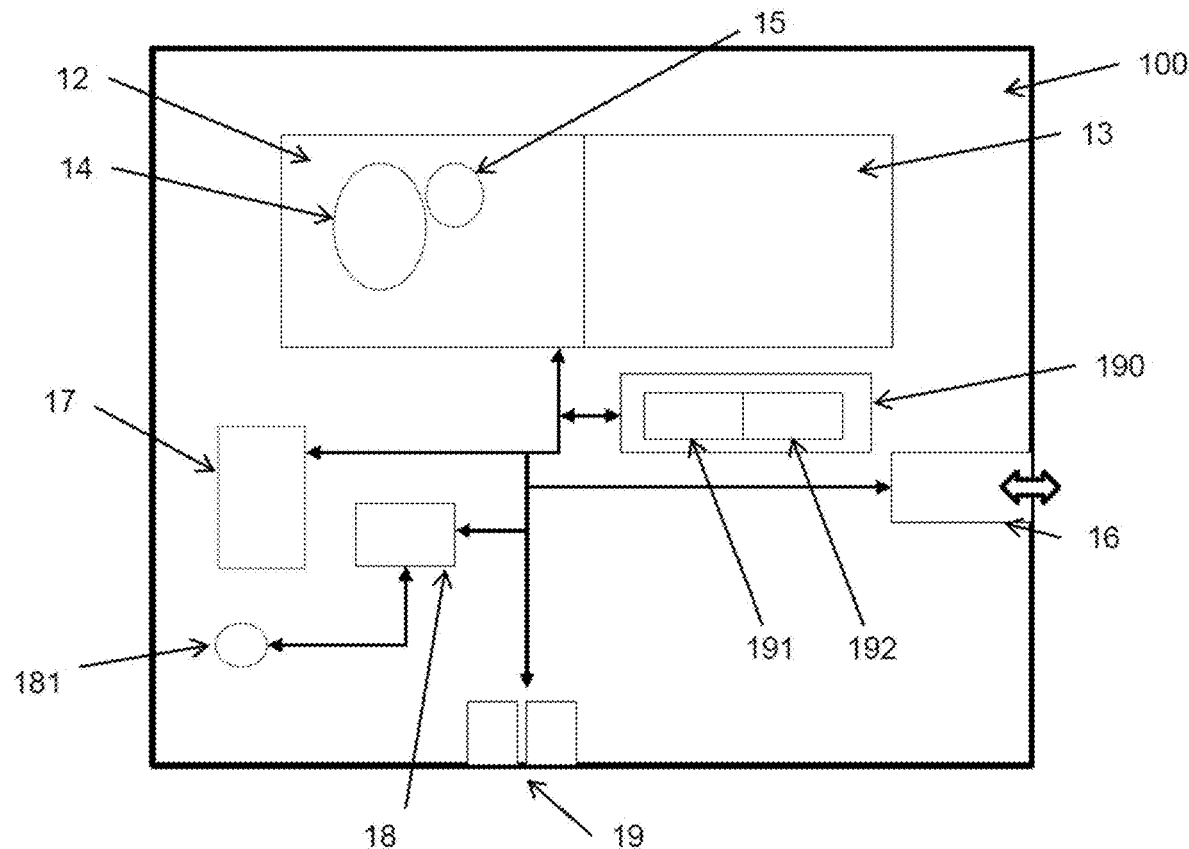
FIG. 4 shows in schematic form a terminal adapted for use in embodiments of the disclosure.

FIG. 4 illustrates the functional features at the point of interaction for use in embodiments of the disclosure in more detail—in this connection, features of both the contactless reader 3 and the terminal 4 will be considered, and "terminal" used as a general term to describe this overall functionality. The terminal 100 has at least one processor 13 and associated memories 12. The base function of the terminal in the case shown is to operate as a point of interaction (POI) with a financial system—such a terminal may be a point of sale (POS) terminal or an automated teller machine (ATM) for example. In other embodiments, the terminal may have another function altogether (for example, a security system terminal for evaluating user credentials). In the case shown, the terminal 100 has an operating system 14 and transaction software 15 (these may be provided together in a single assemblage of code, or may both be divided into a number of different components, but are represented here as two elements for convenience). The operating system 14 manages hardware resources and provides common services for applications, whereas the transaction software 15 performs the base function of the terminal and may be provided (for example) as one or more applications. The terminal 100 will generally have a protected channel 16 to another party such as an acquiring bank (this may, for example, be effected over a public network by use of encryption)—embodiments of the disclosure have particular value in situations where this protected channel 16 is only sporadically available to the terminal 100. The terminal 100 will also have means to make a connection to a device such as a transaction card. In this case, the terminal has contactless reader functionality 17 and an NFC controller 18 and antenna 181 to allow a contactless card connection to a contactless card, or a device such as an NFC-enabled mobile telephone able to act as a proxy for a contactless card. The terminal 100 may have additional ports 19 to allow data to be provided to it from other sources (for example, by USB stick). Transactions may be established through the contact card reader functionality 17 or through the NFC controller 18, or indeed any other appropriate local connection.

The terminal 100 has capability to carry out cryptographic operations, including the generation of new key pairs. While (as noted above with reference to the discussion of the transaction card) this can in principle be provided inside or outside the main operating environment, this is provided here by a secure module 190 within the terminal containing a cryptographic processor 191 and a memory 192. As with the card, the terminal may have a private and public key pair to identify it (and may have a similar chain of trust ending with the transaction infrastructure provider), but it is also capable of generating new public and private keys, and in particular ephemeral key pairs for use in terminal sessions.

Figure 5:
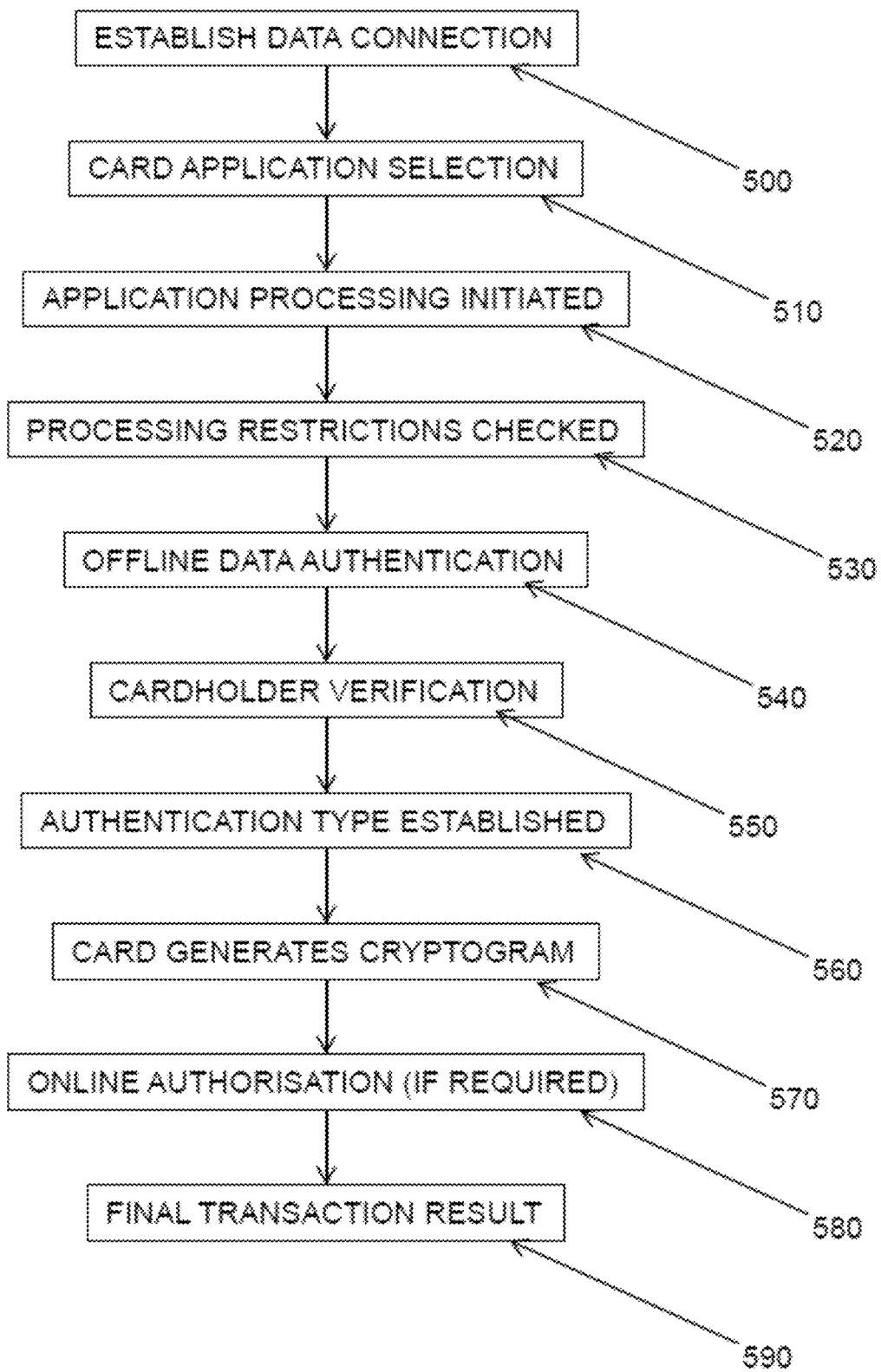
FIG. 5 shows a generic form of a transaction interaction between the payment card of FIG. 3 and the terminal of FIG. 4 in the payment infrastructure of FIG. 1.

The steps in a typical session between a payment card 2 and a terminal 100 are illustrated in FIG. 5—these steps are typical for a transaction implementing EMV protocols and do not define the present disclosure, but rather provide a context in which embodiments of the disclosure may be used and against which modifications provided by embodiments of the disclosure should be considered.

The first step is to establish a data connection 500 between the card 2 and the terminal 100—this may be through contacts ("chip-and-PIN") in which case interaction protocols are governed by ISO/IEC 7816, or contactless through short range wireless communication, in which case interaction protocols are governed by ISO/IEC 14443. A suitable application (there may be multiple applications present) on the card 2 is selected 510 for the transaction and application processing initiated 520 with the terminal 100 providing required data to the card, and the card providing data relevant to its state. The terminal 100 checks 530 for any processing restrictions from the card data. Offline data authentication using public key cryptography is then used to validate 540 the card with this cryptographic capability and also to establish a secure channel between the card 2 and the terminal 100. Cardholder verification 550 (for example, through PIN entry at the terminal for a contact card) may then take place to evaluate whether the person controlling the card is the legitimate cardholder. The terminal may then evaluate whether online authorization is needed, and provides 560 the result of its action to the card. The card then generates 570 a cryptogram (the type of cryptogram depending on the authorization type result provided by the terminal) and sends it to the terminal. If online authorization is needed, the cryptogram is sent together with transaction data through the transaction infrastructure to the issuer for authorization 580, with an authorization result (possibly also providing data returned from the issuer for the card) returned to the terminal 100, leading to ultimate acceptance or refusal of the transaction 590.

One aspect of this process is cardholder verification 550, generally performed using a cardholder verification method (CVM). The CVM is used to authenticate the user of the payment card—to determine that the person using the payment card is the legitimate cardholder. There are a number of possible CVMs supported or to be supported by EMV protocols, such as signature and a PIN verified online by the issuer, for example. In certain circumstances—for low value transactions, for example—there may be no CVM required. In the case of a payment device with more capabilities than an entirely passive payment card, such as a mobile telephone handset, there may be a consumer device cardholder verification method (CDCVM). For example, for a mobile telephone handset, this may be a biometric such as a fingerprint.

In conventional EMV processing as described above, the card provides the terminal with a list of possible CVM choices, ordered according to issuer priority. The terminal then selects which CVM to use from the list, and it may then provide an appropriate communication to indicate to the user that this CVM is required. If the CVM fails, it may be possible for the terminal to move to the next CVM in the list.

Figure 6:
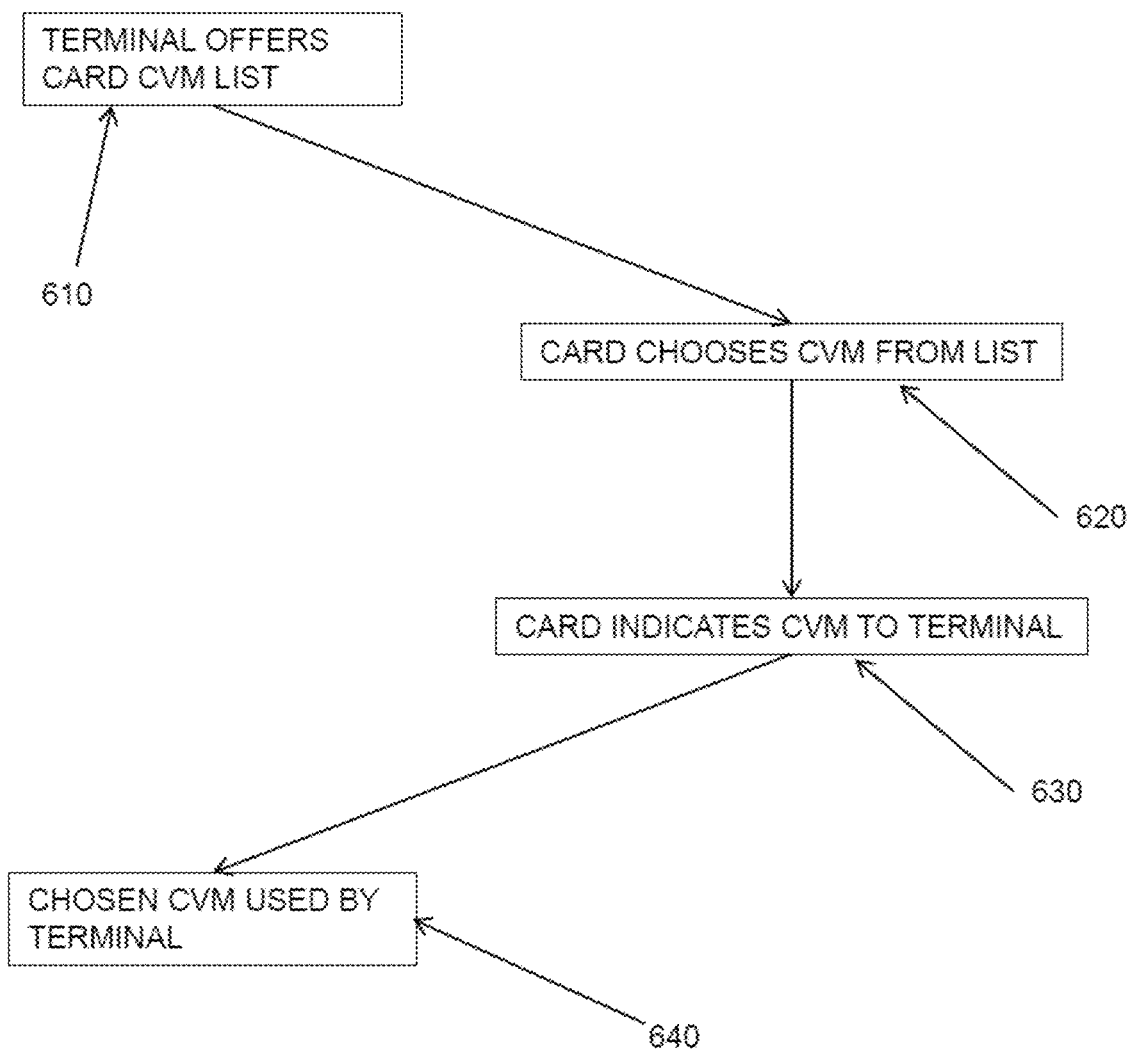
FIG. 6 shows an approach to choosing a cardholder verification method according to an embodiment of the disclosure.

A more flexible approach is provided by embodiments of the disclosure, as is shown in FIG. 6. Instead of a selection by the terminal from a list offered by the card, the terminal offers 610 the card a list of the CVMs that it is prepared to be used for the transaction—this may be influenced by the circumstances of the transaction itself (so, for example, no CVM may not be offered as an option if the transaction is for a significant value). The card picks 620 a CVM from this list, and it indicates 630 its CVM choice—this may be, for example, done at the time of providing a response to the request to generate a cryptogram (the EMV GENERATE AC command). This is then used 640 by the terminal. This approach reduces the risk of CVM failure and ensures an appropriate CVM choice for the transaction.

Suitable processes at the reader and at the card are described in more detail below. Aspects of EMV processing other than CVM processing are only described so far as is necessary to provide technical context to the implementation described—general principles of EMV processing are familiar to the skilled person, and for technical detail of existing implementations the person skilled in the art would refer to the EMV technical specifications, for example as provided at https://www.emvco.com/document-search/.

The CVM implementation described here is appropriate for use in Enhanced Processing of contactless transactions in EMV—conventional implementations follow existing EMV contactless specifications (in Book C-2 of the EMV protocols—this may be referred to below as C2 Processing). Enhanced Processing allows for greater technical capability in cards and readers than may have been available in earlier implementations, allowing for a new security architecture based on ECC rather than RSA for public key cryptography along with use of AES for symmetric encryption and a number of new functional elements. Implementations of the disclosure are not limited to implementations of Enhanced Processing, and aspects of Enhanced Processing are only described here in so far as they provide technical details necessary for full description of how relevant implementations are technically implemented.

Figure 7:
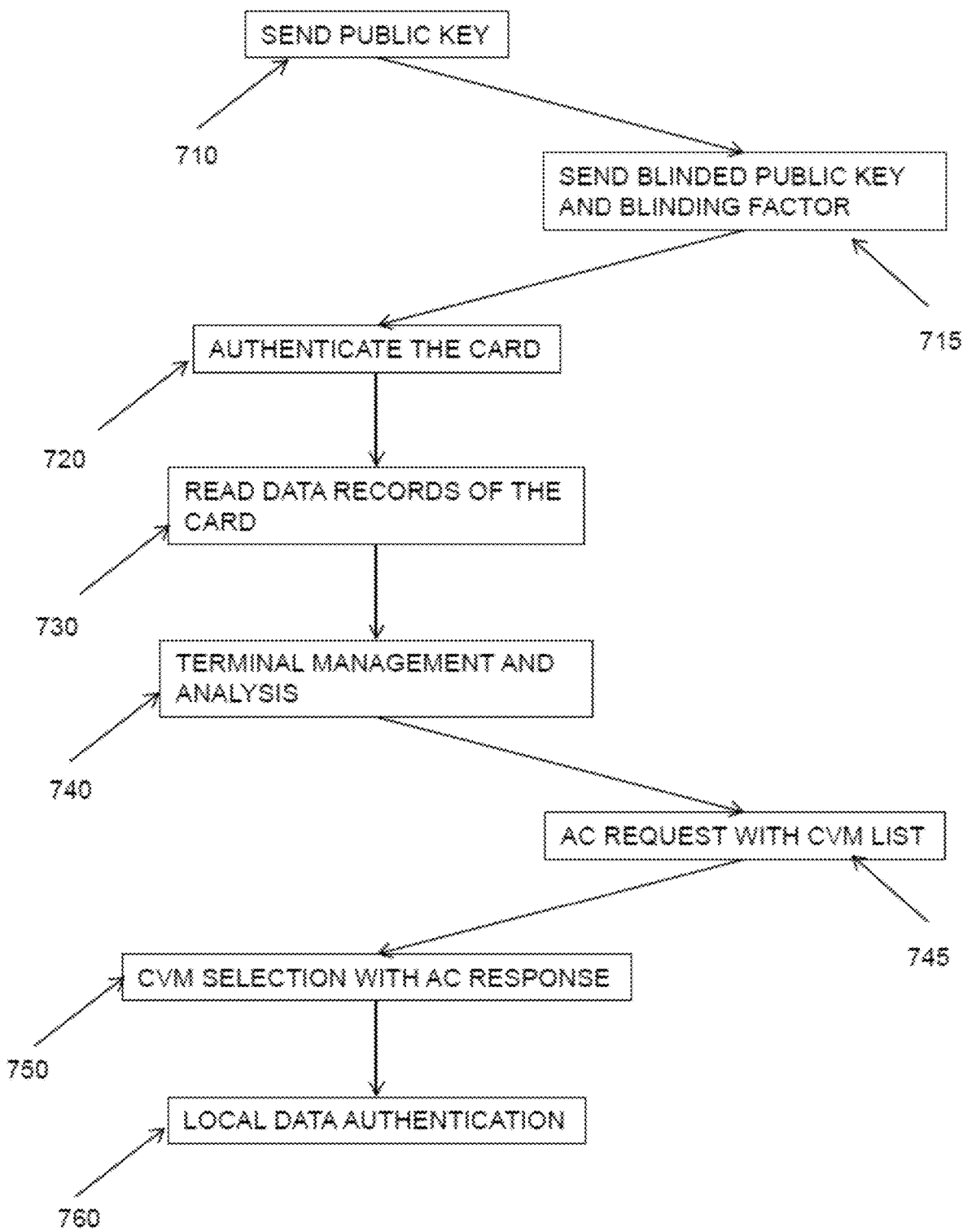
FIG. 7 shows an enhanced processing flow for a contactless transaction adapted to select a cardholder verification method in accordance with an embodiment of the disclosure.

A general indication of Enhanced Processing flow is however shown in FIG. 7. Once it is determined that the Enhanced Processing has been selected (which it will be if it can be performed by both card and terminal), the kernel of the terminal transaction processing software (hereafter "the Kernel") performs the following steps (where not further described, names in capital letters refer to EMV commands described in existing EMV technical specifications):

1. The Kernel sends 710 a public key to the card in the GET PROCESSING OPTIONS command data. Using its private key and a blinding factor, the card generates a shared secret and from that a set of session keys. In the GET PROCESSING OPTIONS response 715, the card sends its blinded public key and the encrypted blinding factor so that the Kernel can compute the same shared secret and session keys. The blinding factor permits the Kernel to authenticate 720 the card (in conjunction with the card certificates).

2. The Kernel reads 730 the data records of the card (using READ RECORD commands). Any record data returned by the card that uniquely identifies it (for example the Application PAN), has been encrypted by the card using one of the session keys and the AES block cipher.

3. The Kernel performs 740 Terminal Risk Management and Terminal Action Analysis.

4. The Kernel requests 745 an Application Cryptogram from the card by issuing a GENERATE AC command. The Kernel offers up to the card in the GENERATE AC command data a list of the CVMs that it supports for the transaction and the card picks one from that list. The card informs 750 the Kernel of its choice in the response to the GENERATE AC command.

5. The Kernel performs 760 LDA (Local Data Authentication) by the verification of an AES CMAC (Cipher-based Message Authentication Code) calculated using one of the session keys. The session key is authenticated by validating the certificates and the blinding factor.

Using this approach, the first step in CVM processing is for the Kernel to provide the card with acceptable CVM choices. In this implementation, the terminal does not distinguish between types of transacting device—for example, it will not distinguish between transactions performed by mobile and transactions performed by card—but it may edit its choices dependent on details of the transaction. As previously described, the actual selection of the CVM will be made by the card (and this may, as described below, result in the card delegating cardholder verification to the terminal).

In the specific embodiment described here, four CVM options may appear in the list:
No CVM
Signature
CDCVM
Online PIN.

Some, but not necessarily all, of these options will be offered to the card. The concept of a CVM limit is maintained on the Kernel and is used to determine which CVMs are offered to the Card. If the transaction is above the CVM limit then 'No CVM' should not be offered.

The list of CVMs is coded in the Terminal Risk Management Data—this is an 8 byte field containing information relating to the requirements made by the terminal in order for it to manage the risk of the transaction according to the requirements placed upon it (for example, by the merchant's acquiring bank, or by the transaction scheme). Values for Terminal Risk Management Data are determined by the terminal (in management and analysis step 730 as identified above) on the basis of the information available to the terminal at that point, which will include details of the proposed transaction. It is then the Terminal Risk Management Data that is used to communicate the available CVMs from the Kernel to the card is populated.

Terminal Risk Management Data also carries three other CVM related bits. The first of these, 'CVM Limit exceeded' is used as an explicit indication to the card that the transaction amount exceeds the limit above which a CVM is required by the merchant. The other two bits ('CDCVM bypass requested' and 'SCA exempt') relate to the business rules relevant to this installation; whether for example CDCVM bypass is requested by a transit terminal or whether regulation indicates that the transaction should not be accounted in the card's lost and stolen protection.

In this embodiment, Terminal Risk Management Data is transmitted to the card when the terminal requests the card to provide an application cryptogram for the transaction by sending a GENERATE AC command. Based on this information, the card then chooses the CVM to be used for the transaction.

Figure 8:
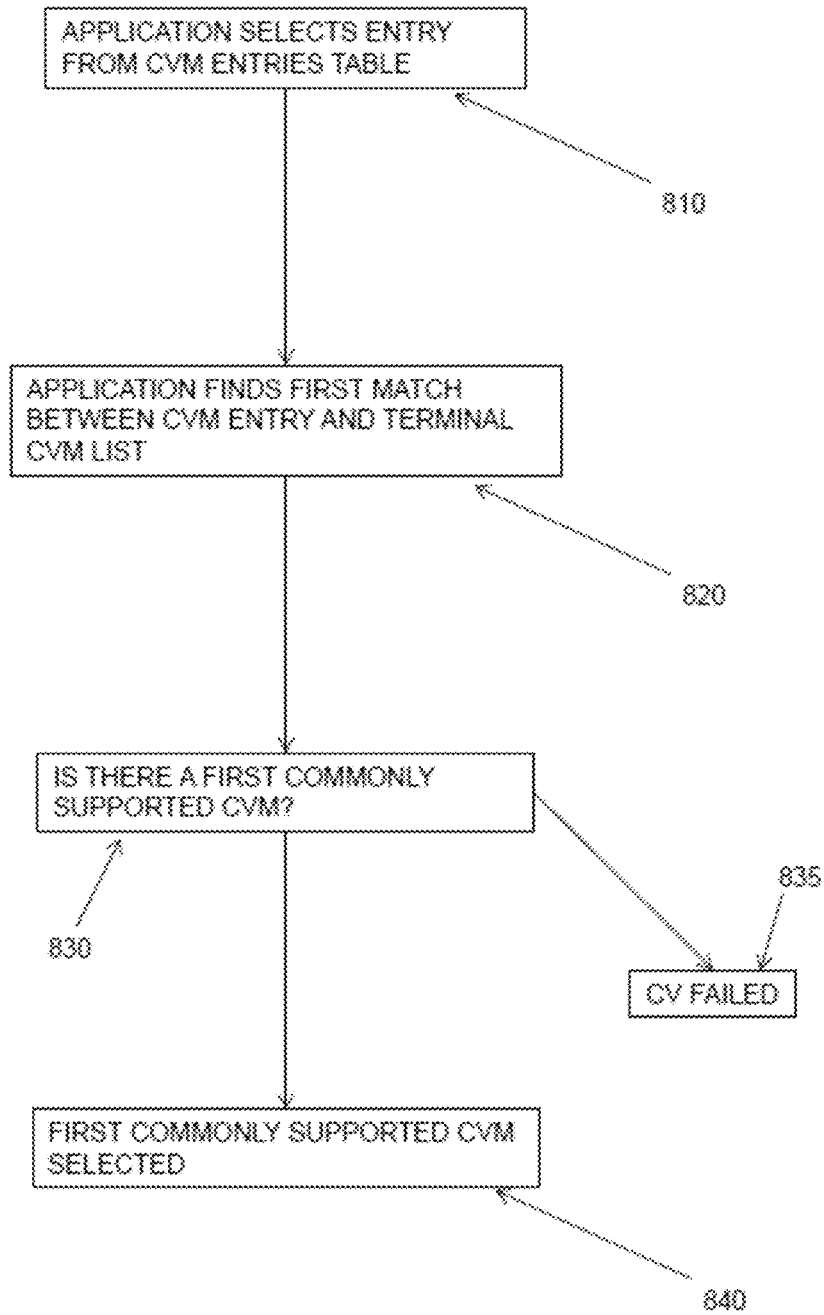
FIG. 8 shows a mechanism for selecting a cardholder verification method in the processing flow of FIG. 7.

An exemplary routine for CVM selection at the card is the "Compute CVM to Apply" process shown schematically in FIG. 8.

In a first step 810, the application selects the entry to use from the CVM Entries Table. This entry is identified by the value of the CVM Entry ID. In a second step 820, the application finds the first match between the CVMs supported by the application as listed in the entry and the CVMs supported by the terminal as indicated in the Terminal Risk Management Data. After making 830 this evaluation, the first commonly supported CVM is then returned 840 as Cardholder Verification Decision. If there is no CVM in common, CV FAILED is returned 745 as Cardholder Verification Decision.

Possible outputs for Card Verification Decision are thus as follows (with RFU used for Reserved for Update, allowing future modifications).

Cardholder Verification Decision:
'00': NO CVM
'01': OBTAIN SIGNATURE
'02': ONLINE PIN
'03': CONFIRMATION CODE VERIFIED (not used by this specification)
'0F': N/A (not used by this specification)
'FF: CV FAILED
Other values RFU.

The computation can then be carried out as follows:

```
FUNCTION ComputeCVMToApply( ) as Cardholder Verification Decision
# select in CVM Entries Table the row corresponding to the value of CVM Entry ID
Entry := CVM Entries Table[CVM Entry ID]
   FOR i := 1 TO 3
   IF Entry[i] = '00' (NO CVM) AND 'No CVM required (Contactless)' in Terminal Risk
   Management Data is set
      THEN
      ComputeCVMToApply := '00' (NO CVM)
      EXIT FUNCTION
      ENDIF
      IF Entry[i] = '01' (OBTAIN SIGNATURE) AND 'Signature (paper) (Contactless)' in Termi-
nal
      Risk Management Data is set
      THEN
      ComputeCVMToApply := '01' (OBTAIN SIGNATURE)
      EXIT FUNCTION
      ENDIF
   IF Entry[i] = '02' (ONLINE PIN) AND 'Enciphered PIN verified online (Contactless)' in
   Terminal Risk Management Data is set
      THEN
      ComputeCVMToApply := '02' (ONLINE PIN)
      EXIT FUNCTION
      ENDIF
   NEXT
ComputeCVMToApply := 'FF' (CV FAILED)
EXIT FUNCTION
END FUNCTION
```

Based on the above, the card then chooses the CVM to be used for this transaction. The card's decision is indicated in the Cardholder Verification Decision data object included in the GENERATE AC response. This data object reflects the card's choice of CVM. The card may indicate CV FAILED if there is no CVM available from the Kernel that the Card is willing to use for this transaction. In the light of this a bit is defined in Kernel Configuration (a self-explanatory data object at the terminal) with the meaning: 'Decline if CV fails'. This allows the Kernel to decline a transaction if it cardholder verification for a transaction is required, but the card has indicated CV FAILED in its response.

Because the choice of CVM by the card also affects the value of the Terminal Verification Results, the card may change certain bits in the Terminal Verification Results. This is a data object maintained by the terminal that indicates status of different functions from the terminal's perspective. This will have been set and sent to the card already, so any modification—for example the Card chooses Online PIN, the Terminal Verification Results need to be set to indicate that Online PIN will be entered—will mean that the card needs to use a TVR value different from the value it received in the GENERATE AC command data. To achieve this, an option is that the card includes in the GENERATE AC response data a Card TVR corresponding to the one it actually used for generating the Application Cryptogram, with the Kernel then needing to reflect this change in the data sent to the acquirer.

A mask value may be applied to prevent the card from changing bits in the Terminal Verification Results that reflect the Kernel's decision making, rather than any action taken by the card. Such a mask used in embodiments is referred to as the Kernel Reserved TVR Mask and the bits set to 1 in it cannot be altered by the card. The Kernel before sending data to the acquirer sets the Terminal Verification Results bits that the card can change to the value of the corresponding bits in the Card TVR.

As indicated above, the basic approach taken here of allowing a card to select a verification options for a user selected from a list of options provided by a reader can be used in other technical contexts. The simplest is in access control—a reader device may offer different approaches to recognition of a bearer for access control (in some cases nothing further may be needed, but in other cases it may be necessary to use an additional security factor such as entry of a PIN on a number entry pad, use of a biometric such as a fingerprint reader, use of a camera, or confirmation through a second channel such as a mobile phone), and use of this approach may allow a card to specify which type of higher security factor to use.

As the skilled person will appreciate, further embodiments falling within the spirit and scope of the disclosure may be made.

What is claimed is:

1. A method for verification of a bearer of a credential device at a device reader, the method comprising:
   establishing a digital communication channel between the device reader and the credential device;
   determining, by the device reader, a set of verification options for the bearer and providing the set of verification options to the credential device over the digital communication channel;
   receiving a verification option selected from the set of verification options by the credential device; and
   verifying the bearer of the credential device in accordance with the selected verification option.

2. The method according to claim 1, wherein the credential device is a contactless payment device operating according to EMV protocols.

3. The method according to claim 2, wherein the verification options are cardholder verification methods.

4. The method according to claim 3, wherein the cardholder verification methods comprise:
   no cardholder verification method, consumer device cardholder verification method, online PIN and cardholder signature.

5. The method according to claim 2, wherein the device reader provides a list of cardholder verification methods with a command to provide an application cryptogram, and the payment device provides a chosen cardholder verification method with the application cryptogram.

6. The method according to claim 5, wherein the device reader modifies transaction data from that sent to the contactless payment device in the command to generate the application cryptogram dependent on the chosen cardholder verification method.

7. The method according to claim 6, wherein the device reader modifies the transaction data if the cardholder verification method requested is for an online PIN.

8. The method according to claim 1, wherein the device reader provides a list of verification options, and wherein the credential device selects a first verification option in the list supported by the credential device.

9. A method at a credential device to support verification of a bearer of the credential device at a device reader, the method comprising:
   establishing a digital communication channel between the credential device and the device reader;
   receiving from the device reader a set of verification options for the bearer over the digital communication channel; and
   selecting a verification option from the set of verification options and communicating the selected verification option to the device reader for verifying the bearer of the credential device in accordance with the selected verification option.

10. The method according to claim 9, wherein the credential device is a payment device.

11. The method according to claim 10, wherein the payment device is a contactless payment device.

12. The method according to claim 11, wherein the contactless payment device is a payment card.

13. The method according to claim 10, wherein the payment device operates according to EMV protocols and the verification options are cardholder verification methods.

14. The method according to claim 13, wherein the device reader provides a list of cardholder verification methods with a command to provide an application cryptogram, and the payment device provides a chosen card verification method with the application cryptogram.

15. The method according to claim 13, wherein the cardholder verification methods comprise:
   no cardholder verification method, consumer device cardholder verification method, online PIN and cardholder signature.

16. The method according to claim 9, wherein the device reader provides a list of verification options, and wherein the credential device selects a first verification option in the list supported by the credential device.

17. A credential device configured to support verification of a bearer of the credential device at a device reader, the credential device comprising:
   an application processor;
   one or more memories associated with the application processor; and
   an application stored at the one or more memories that when executed by the application processor direct the credential device to:
      establish a digital communication channel between the credential device and the device reader;
      receive from the device reader a set of verification options for the bearer over the digital communication channel; and
      select a verification option from the set of verification options and communicate the selected verification option to the device reader for verifying the bearer of the credential device in accordance with the selected verification option.

18. The credential device of claim 17, wherein the credential device is a passive device.

19. The credential device of claim 18, wherein the credential device is a contactless payment device.

20. The credential device of claim 19, wherein the credential device is a payment card.

* * * * *